United States Patent
Khurshid et al.

(10) Patent No.: US 12,026,273 B2
(45) Date of Patent: Jul. 2, 2024

(54) SYSTEM AND METHOD TO EXTEND DATA LOSS PREVENTION (DLP) TO LEVERAGE SENSITIVE OUTBOUND EMAILS INVESTIGATIONS—(ANTILEAKS)

(71) Applicant: Saudi Arabian Oil Company, Dhahran (SA)

(72) Inventors: Rafiq Ajmal Khurshid, Dhahran (SA); Saad Farhan Al-Anazi, Dhahran (SA); Mohammed S. Logmani, Dhahran (SA); Abdullah Tariq Al-Essa, Dhahran (SA); Taher A. Alwusaibie, Dhahran (SA); Faissal A. Sulaiman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 165 days.

(21) Appl. No.: 16/998,199

(22) Filed: Aug. 20, 2020

(65) Prior Publication Data
US 2022/0058288 A1  Feb. 24, 2022

(51) Int. Cl.
*H04L 29/06* (2006.01)
*G06F 21/60* (2013.01)
(Continued)

(52) U.S. Cl.
CPC ........ *G06F 21/6227* (2013.01); *G06F 21/604* (2013.01); *G06Q 10/105* (2013.01); *G06Q 10/107* (2013.01); *G06Q 30/0185* (2013.01); *H04L 51/212* (2022.05); *H04L 63/12* (2013.01); *H04L 63/20* (2013.01); *G06Q 10/06393* (2013.01)

(58) Field of Classification Search
CPC .... G06F 21/6227; G06F 21/604; G06F 21/62; G06F 21/554; G06F 21/60; H04L 51/212; H04L 63/12; H04L 63/20; G06Q 10/105; G06Q 10/107; G06Q 30/0185; G06Q 10/06393
See application file for complete search history.

(56) References Cited

U.S. PATENT DOCUMENTS 8,011,003 B2 * 8/2011 Rowney ................ H04L 51/063
726/28
8,281,409 B2 10/2012 Beigelman
(Continued)

FOREIGN PATENT DOCUMENTS

CN 108011809 5/2018
TW 201723915 A * 7/2017

OTHER PUBLICATIONS

Machine translation of TW201723915 A (Year: 2017).*
(Continued)

*Primary Examiner* — Yogesh Paliwal
(74) *Attorney, Agent, or Firm* — Fish & Richardson P.C.

(57) ABSTRACT

The present disclosure describes a computer-implemented method that includes: detecting an incident that an outbound email violates a data leakage prevention (DLP) rule of an enterprise, wherein the DLP rule specifies contents that are reserved for within the enterprise; automatically alerting one or more members of the enterprise of the incident based on a report detailing the incident; and receiving a response from each of the one or more members of the enterprise.

14 Claims, 7 Drawing Sheets

(51) Int. Cl.
*G06F 21/62* (2013.01)
*G06Q 10/105* (2023.01)
*G06Q 10/107* (2023.01)
*G06Q 30/018* (2023.01)
*H04L 9/40* (2022.01)
*H04L 51/212* (2022.01)
*G06Q 10/0639* (2023.01)

(56) References Cited

U.S. PATENT DOCUMENTS

| | | |
|---|---|---|
| 8,832,785 B2 | 9/2014 | Stuntebeck et al. |
| 9,553,860 B2 | 1/2017 | Meyer |
| 9,842,315 B1 | 12/2017 | Raman et al. |
| 2014/0020044 A1* | 1/2014 | Ayres ............... G06F 21/6209 726/1 |
| 2014/0020047 A1 | 1/2014 | Liebmann et al. |
| 2014/0215621 A1* | 7/2014 | Xaypanya ............ H04L 63/145 726/23 |
| 2016/0323243 A1* | 11/2016 | LeVasseur ............ G06F 21/64 |
| 2017/0329972 A1* | 11/2017 | Brisebois ............ G06F 21/577 |
| 2018/0007014 A1 | 1/2018 | Neal |
| 2018/0176190 A1 | 6/2018 | Lin et al. |
| 2020/0280573 A1* | 9/2020 | Johnson ................ G06N 20/00 |

OTHER PUBLICATIONS

PCT International Search Report and Written Opinion in International Appln. No. PCT/US2021/046642, dated Nov. 9, 2021, 13 pages.

Rsaconference.com [online] "RSAC 2017 USA," RCA Conference, Feb. 13-17, 2017, retrieved on Dec. 23, 2020 from URL <https://www.rsaconference.com/USA/2017>, 3 pages.

"Annual Cybersecurity Technical Exchange," Conference, 2018, 1 page.

* cited by examiner

File Edit View Favorites Tools Help

☆ Phone Book ■App Center ■Cloud Drive ■HR Online ■myhome ■Printer installer ■Share ○Download Center OIT OSymantec Data Loss Prevel. ■RSA Data Loss Prevention

AntiLeaks    User    Manager    ISA        John A. Smith   IPO Open Cases    Under Review by ISA    Escalated to CSA Show [10 ▼] entries                        Search

| Sender | Subject | Time | 👤 | ∅ | Justification | Age (Days) | Action |
|---|---|---|---|---|---|---|---|
| Tom B. Adams<br>Security Quality Assurance Group | alert("Presenting the header") | 10/24/2019 2:04:59 PM | 1 | 0 | | 5 | O ✓ 👤 ↻ |
| Mattew C. Beck<br>Security Quality Assurance Group | test1 | 10/24/2019 8:12:14 PM | 1 | 0 | | 5 | O ✓ 👤 ↻ |
| Charles D. Cliffton | SAAC Business Internal Email<br>Security Stack review | 10/23/2019 1:04:59 PM | 3 | 0 | | 6 | O ✓ 👤 ↻ |
| Robert E. Carlson | Testing Large Attachement | 10/23/2019 12:58:27 PM | 1 | 2 | | 6 | O ✓ 👤 ↻ |

Showing 1 to 4 of 4 entries                             Previous [1] Next
© 2019-Antileaks

SYSTEM AND METHOD TO EXTEND DATA LOSS PREVENTION (DLP) TO LEVERAGE SENSITIVE OUTBOUND EMAILS INVESTIGATIONS—(ANTILEAKS)

TECHNICAL FIELD

This disclosure generally relates to data security, and more specifically to the prevention of loss of sensitive data through outgoing emails.

BACKGROUND

Network security policies are often implemented on an enterprise network to enforce data integrity and prevent data extrusion.

SUMMARY

In one aspect, the present disclosure describes a computer-implemented method comprising: detecting an incident that an outbound email violates a data leakage prevention (DLP) rule of an enterprise, wherein the DLP rule specifies contents that are reserved for within the enterprise; automatically alerting one or more members of the enterprise of the incident based on a report detailing the incident; and receiving a response from each of the one or more members of the enterprise.

Implementations may include one or more of the following features.

The computer-implemented method may further include: generating the report detailing the incident as soon as the incident is detected such that at least one member of the enterprise is alerted instantly.

Automatically alerting one or more members of the enterprise may include: identifying a sender of the outbound email; and alerting the sender of the outbound email. The computer-implemented method may further include: soliciting a justification for sending the outbound email from the sender. The computer-implemented method may further include: receiving the justification from the sender. The computer-implemented method may further include: identifying a supervisor of the sender; and alerting the supervisor of the incident based on the report detailing the incident. The computer-implemented method may further include: receiving a determination from the supervisor whether the outbound email is authorized. The computer-implemented method may further include: in response to receiving a determination from the supervisor that the outbound email is authorized, sending the outbound email outside the enterprise.

Automatically alerting one or more members of the enterprise may include: automatically alerting an information security analyst (ISA) of the outbound email. The computer-implemented method may further include: whitelisting one or more employees of the enterprise such that outbound emails from the one or more employees are not subject to the DLP rule.

In another aspect, the present disclosure describes a computer system comprising: one or more processors configured to perform operations of: detecting an incident that an outbound email violates a data leakage prevention (DLP) rule of an enterprise, wherein the DLP rule specifies contents that are reserved for within the enterprise; automatically alerting one or more members of the enterprise of the incident based on a report detailing the incident; and receiving a response from each of the one or more members of the enterprise.

Implementations may include one or more of the following features.

The operations may further include: generating the report detailing the incident as soon as the incident is detected such that at least one member of the enterprise is alerted instantly.

Automatically alerting one or more members of the enterprise may include: identifying a sender of the outbound email; and alerting the sender of the outbound email. The operations may further include: soliciting a justification for sending the outbound email from the sender. The computer-implemented method may further include: receiving the justification from the sender. The operations may further include: identifying a supervisor of the sender; and alerting the supervisor of the incident based on the report detailing the incident. The operations may further include: receiving a determination from the supervisor whether the outbound email is authorized. The operations may further include: in response to receiving a determination from the supervisor that the outbound email is authorized, sending the outbound email outside the enterprise.

Automatically alerting one or more members of the enterprise may include: automatically alerting an information security analyst (ISA) of the outbound email. The operations may further include: whitelisting one or more employees of the enterprise such that outbound emails from the one or more employees are not subject to the DLP rule.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Data Loss Prevention (DLP) is a strategy for restricting; end users from sending sensitive or critical information outside the corporate network. The disclosed technology is directed to extending DLP capabilities in a decentralized management of security operation for large enterprises. One emphasis is the management of an effective DLP incidents lifecycle when a DLP policy violation is detected to reduce the risk of data leakages. Indeed, the disclosed technology provides a solution to extend a DLP system to a large enterprise network using decentralized security operations to expedite investigation processes and reduce the risks of data leakages.

The implementations may include the following salient features. The implementations may provide an integrated solution with the corporate human resource database system. The implementations may provide a DLP dashboard for an employee to view the incident's details, and update incidents with justification for sending sensitive data to outside the company. The implementations may also provide a DLP dashboard for an analyst to view the incident's details, and enter their input/remarks. The implementations may further provide a DLP dashboard for a high-level manager to view the incidents and evidence (email/attachment/file), delegate to another person or department for additional processing, whitelist and take action on the DLP incidents. The implementations may additionally provide a DLP dashboard for a corporate security officer view the incidents and evidence (email/attachment/file) which have been escalated for investigation. The implementations may additionally provide whitelisting capabilities, and generate reports with key performance indicators (KPI).

Figure 1:
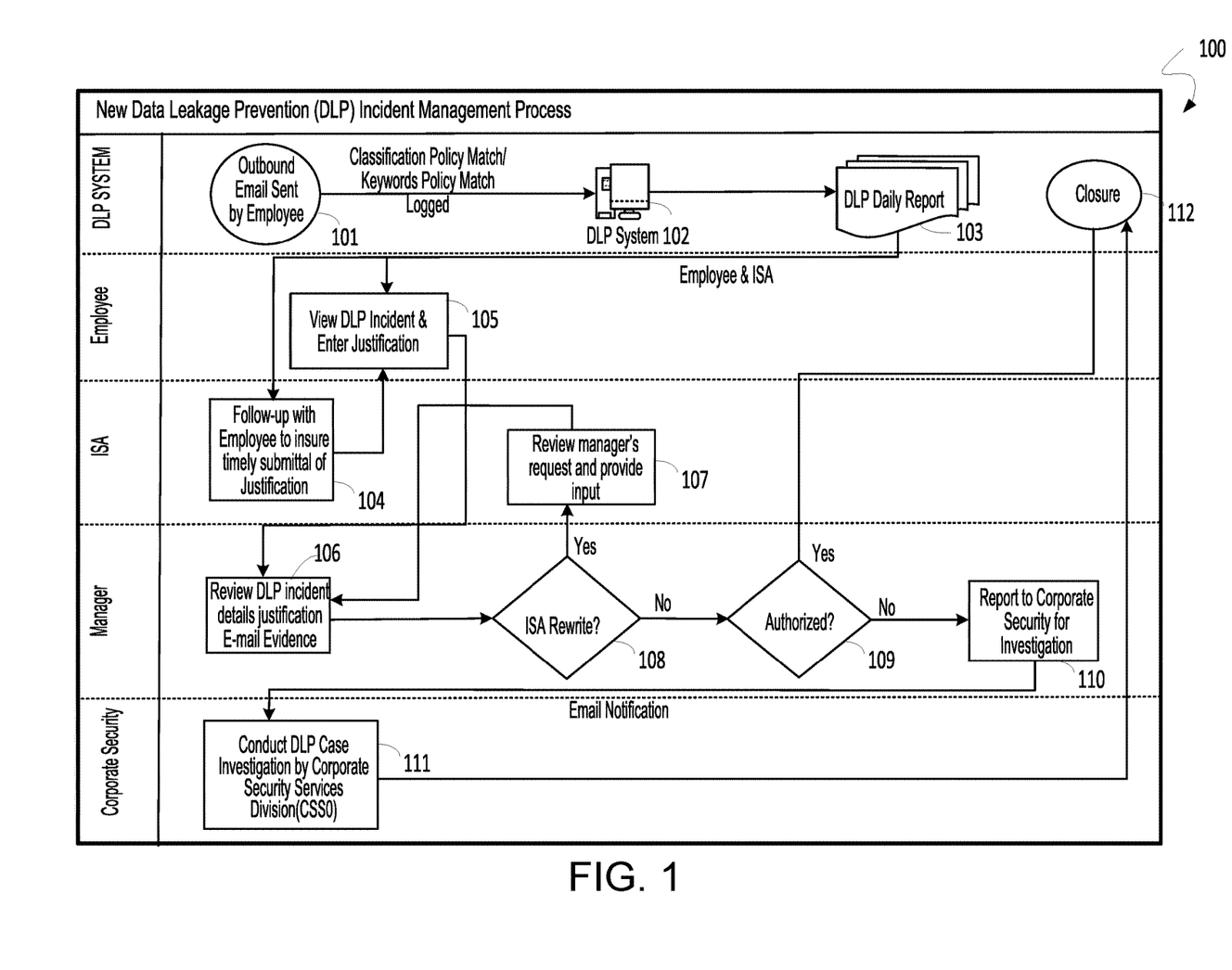
FIG. 1 illustrates an example of a diagram according to an implementation of the present disclosure.

Some implementations may route DLP incident(s) to various internal parties on the enterprise network. Referring to FIG. 1, diagram 100 illustrates an example according to some implementations of the present disclosure. In this example, the DLP system 102 can automatically detect an outbound email sent by an employee as violating a data security policy. The detection may be based on, for example, a match of a classification policy, or a match of a keyword policy. In some cases, based on a collection of words and phrases and using a Boolean logic, the DLP policy identifies sensitive document regardless of data classification label or tool. For example, if a company has defined a. DLP Classification Policy to monitor "Confidential" label/meta data inserted by the classification tool, then a user, with potentially malicious intent for confidential data extrusion, may decide to classify it other than "Confidential" to bypass the DLP classification policy as the classification is a mandatory field for all emai Is and documents. In this scenario, the DLP system will still look for the content of the email body as well as the content of the attached files using a data dictionary of sensitive documents based on DLP keywords policies, Indeed, some implementations can leverage natural language processing (NPL) based on a taxonomy of words and phrases. The taxonomy can be trained over time and thus adaptive.

In more detail, an outbound email may be processed as part of the DLP policy (Report or Block). If the DLP Policy is to monitor, report and justify, then the outbound email will not be withheld. If, however, the DLP policy is to monitor, block and justify, then the outbound email will not be sent and will be withheld by the mail server, for example, an exchange server. In both cases, the notification can be sent as soon as the outbound email is detected by the DLP system. The temporal aspect is known as near-real-time.

The DLP system 102 may generate a periodic report, for example, a daily report 103. In some cases, the report can be instant or on-demand (for example, by an information security analyst), The report can notify the sender, an employee, of the out-bound email. The employee may receive, for example, an email, or a text message, with a link to a dashboard showing details of the incident. The employee may view the details of the DLP incident and enter justification, if any, for sending the information that triggered the incident report (105).

The report can also notify the information security analyst (ISA). The ISA may follow up with the employee to solicit, timely submission of justification for sending the information that triggered the incident report (104). In some cases, the solicitation from the ISA may be appended to the dashboard viewable to the employee (105). In these examples, once the employee has provided justification, the manager may receive an email, or an internal text message, to review details of the DLP incident along with the justification for sending the information that triggered the DLP incident (106). In some cases, the process may proceed to determine whether the incident report requires a rewrite by the ISA (108). If the process determines that the incident report requires a rewrite of the incident report, the process may proceed to have the ISA review manager's request and enter ISA's input (107). In this case, the revised DLP incident report may be routed back to the manager for additional review (106). For example, the process can automatically route DLP incident details to the head of the organization of the sender according to corporate internal CRM database for the head of the organization to review and take appropriate action. On the other hand, if the process determines that the incident does not require a rewrite by the ISA, the process may proceed to determine whether the out-bound transmission is authorized (109). If the process determines that the out-bound transmission is authorized, the process may terminate and conclude with closure (112). In cases where the outbound email is withheld, the email server may resume transmission of the outbound email. If the process determines that the out-bound transmission is not authorized, the process may proceed to report to corporate security for investigation (110). For example, when the incident is marked "Un-Authorized", a decision taken by the head of the organization, the process can automatically route a DLP investigation request with incident details to the corporate security organization to conduct formal investigation. In this scenario, the corporate security, for example, a staff member at the security services division (or dedicated software service), can conduct DLP investigation to look into the incident until closure (112).

In these examples, the notification can be through an email with a link to "AntiLeaks" dashboard for a corporate citizen to review details, enter justification or provide comments. Each instance of the dashboard involves a user interface through which the recipient can review incident details and provide justification or enter comments. In some cases where the information security analyst (ISA) is also notified through email with a link to "AntiLeaks" dashboard, the ISA can review incident and follow-up with employee for prompt or additional response.

Figure 2A:
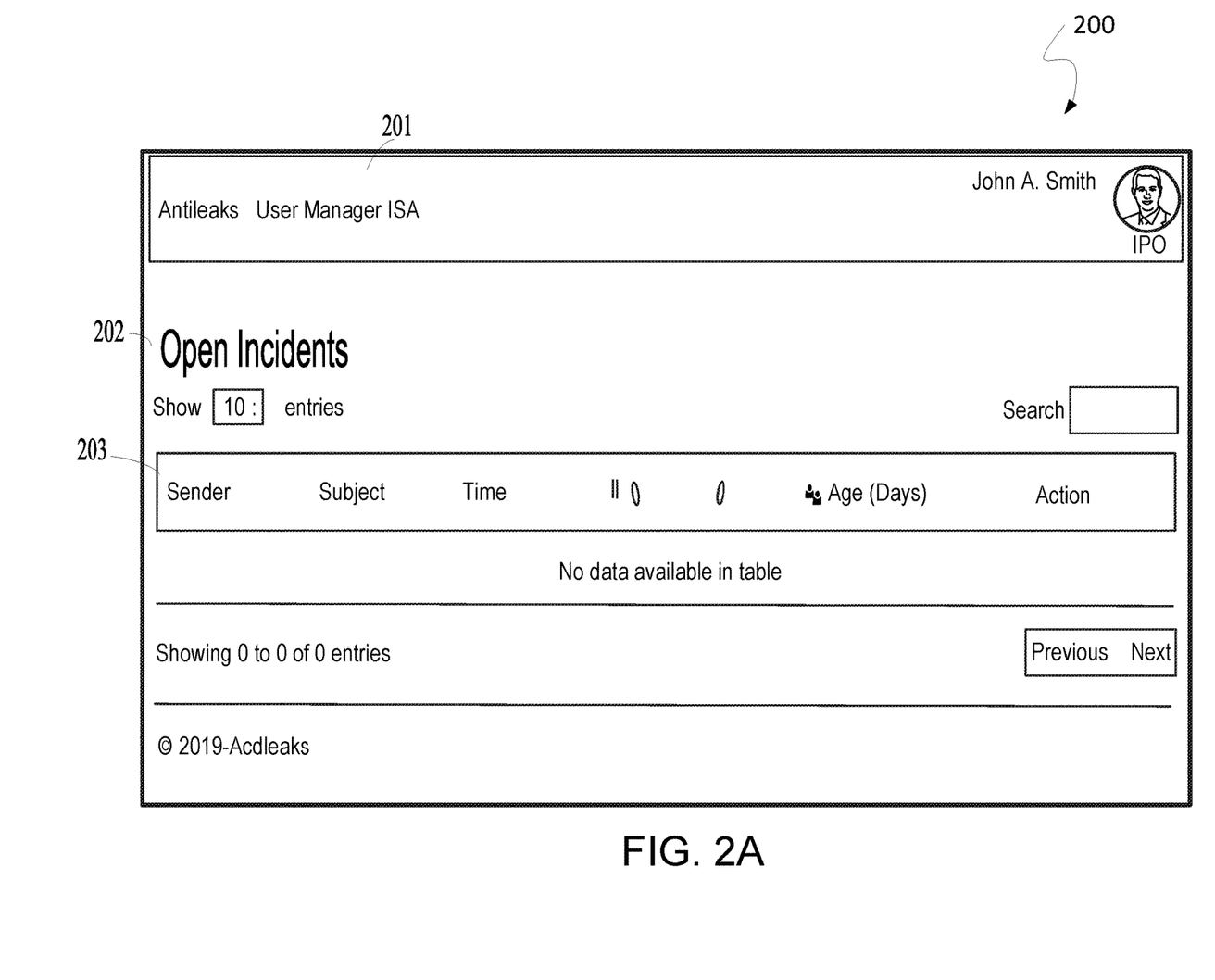
FIGS. 2A to 2D illustrate examples of user interfaces of a dashboard according to an implementation of the present disclosure.

The AntiLeaks dashboard for the manager may also include a user interface for the manager to classify the sender as a whitelisted employee to be excluded from DLP incidents. Further referring to FIG. 2A-2D, some examples of the user interface are illustrated. In diagram 200, panel 201 lists menu options for "Antileaks," "User," "Manager," and "ISA." Here, "User," "Manager," and "ISA" each refers to a view specific to the employee (whose out-bound email set off the DLP incident), the manager (who supervises the employee), and the ISA (who analyzes the security incidents), When "Antileaks" is activated, as shown in FIG. 2A, the listing of open incidents (202) is presented. Each outbound email that triggered the DLP incident is presented with a number of fields (203) including: Sender, Subject, Time, Age, and Action. As illustrated, FIG. 2A lists 0 incidents.

Figure 2B:
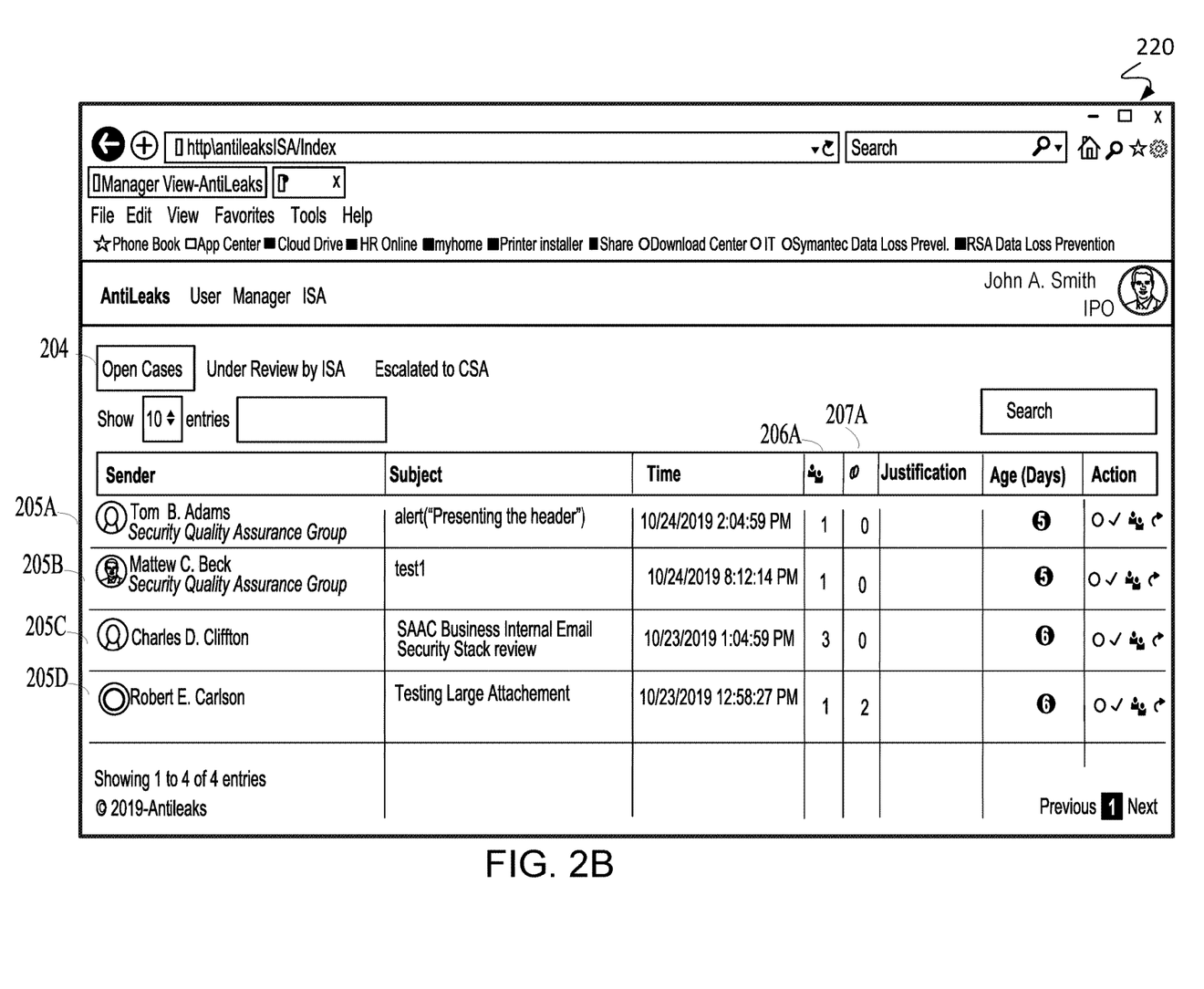

For additional explanation, diagram 220 of FIG. 2B illustrates a number of open cases (204). In this example, listing 205A shows an example of an out-bound email from a sender which may have triggered a rule about the header. This example of listing 205A also includes time of attempted transmission, number of people involved, age (in number of days) (206A), number of attachments (207A), justification for the transmission, and action that can be taken. Here, the available action can include approving (for example, through a form of whitelisting). The available action can also include delegating to another person, for example, a manager supervising the employee who transmitted the out-bound email. Listings 205B to 205D likewise correspond to pending items of out-bound emails that have triggered one or more rules to set off a DLP incident.

Figure 2C:
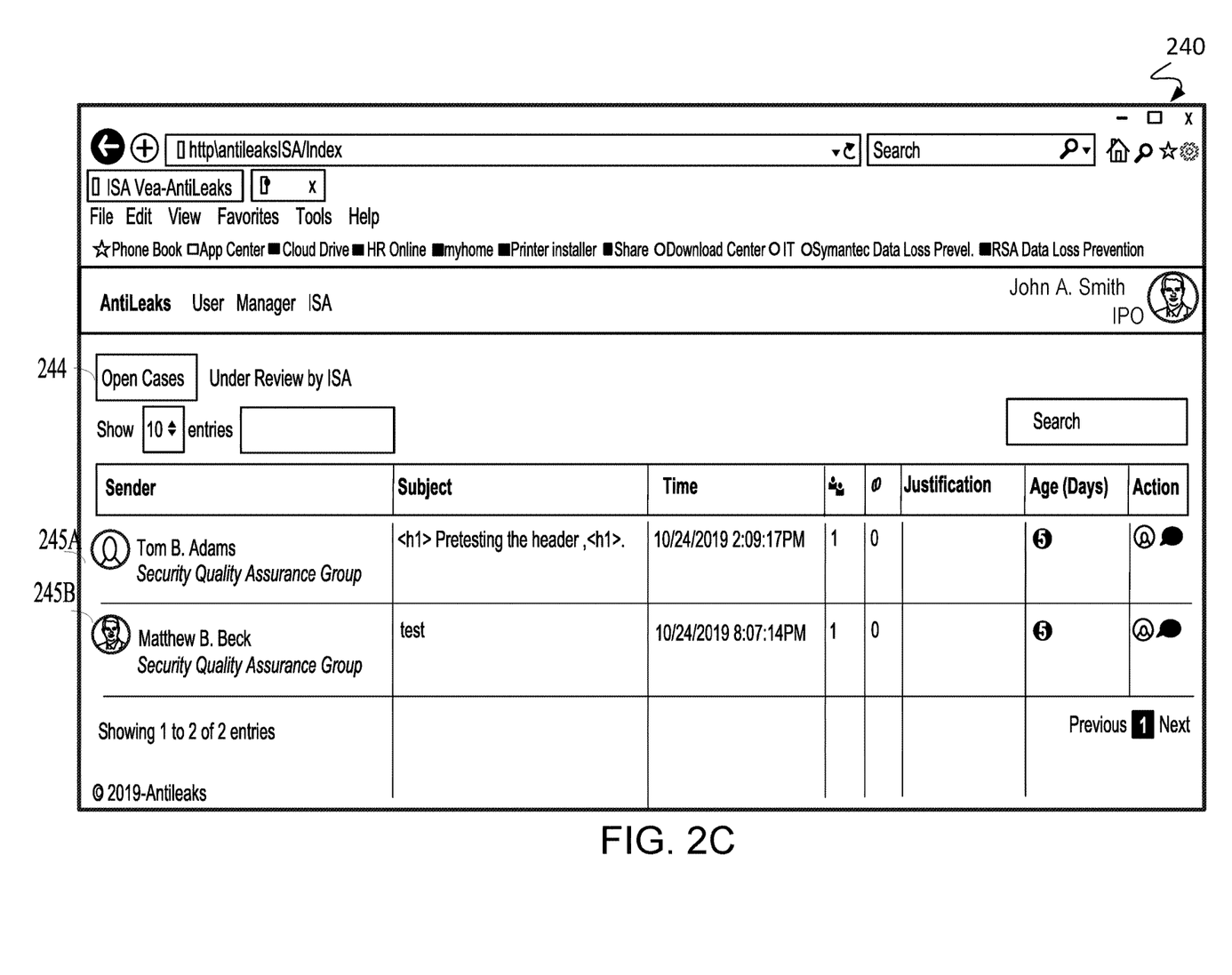
Figure 2D:
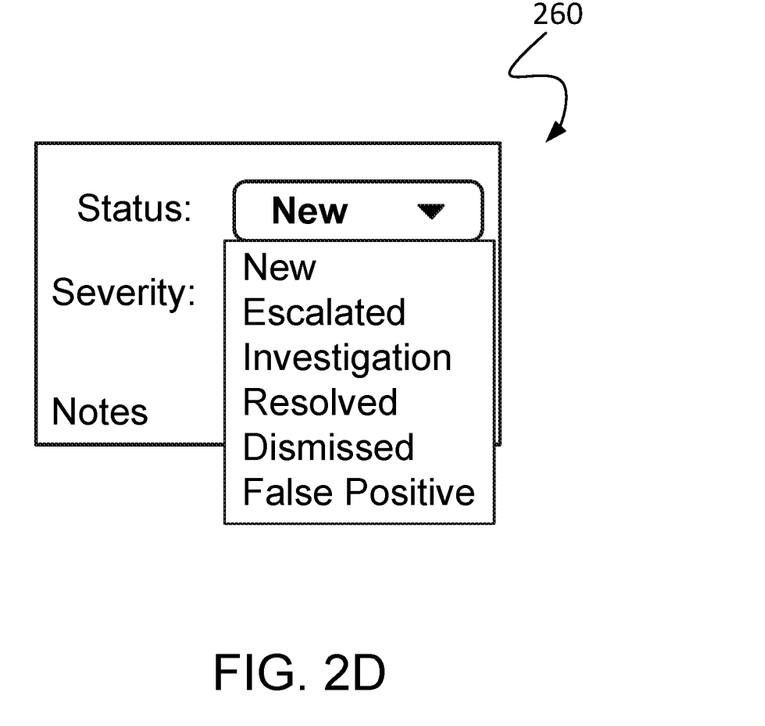

Similarly, diagram 240 of FIG. 2C illustrates a number of opening cases (244) include listings 245A and 245B. Menu 260 in FIG. 2D illustrates an example for, for example, the ISA, to mark a particular incident (corresponding to a particular listing) as one of "New," "Escalated," "Investigation," Resolved," "Dismissed, and "False Positive," each corresponding to a particular class of response. Menu 260 further allows the ISA, for example, to enter severity level of the incident and additional notes.

In various implementations, a whitelisting feature, as approved by, for example, the organization head, can be available to exempt/whitelist employees (on a "per person" basis) for specific duration from the DLP "Antiteaks." Whitelisted employees may not receive notifications of DLP incidents (in the form of an email or an internal text message) to solicit justification for the distribution of sensitive data to external destination that has triggered the DLP incident.

Figure 3:
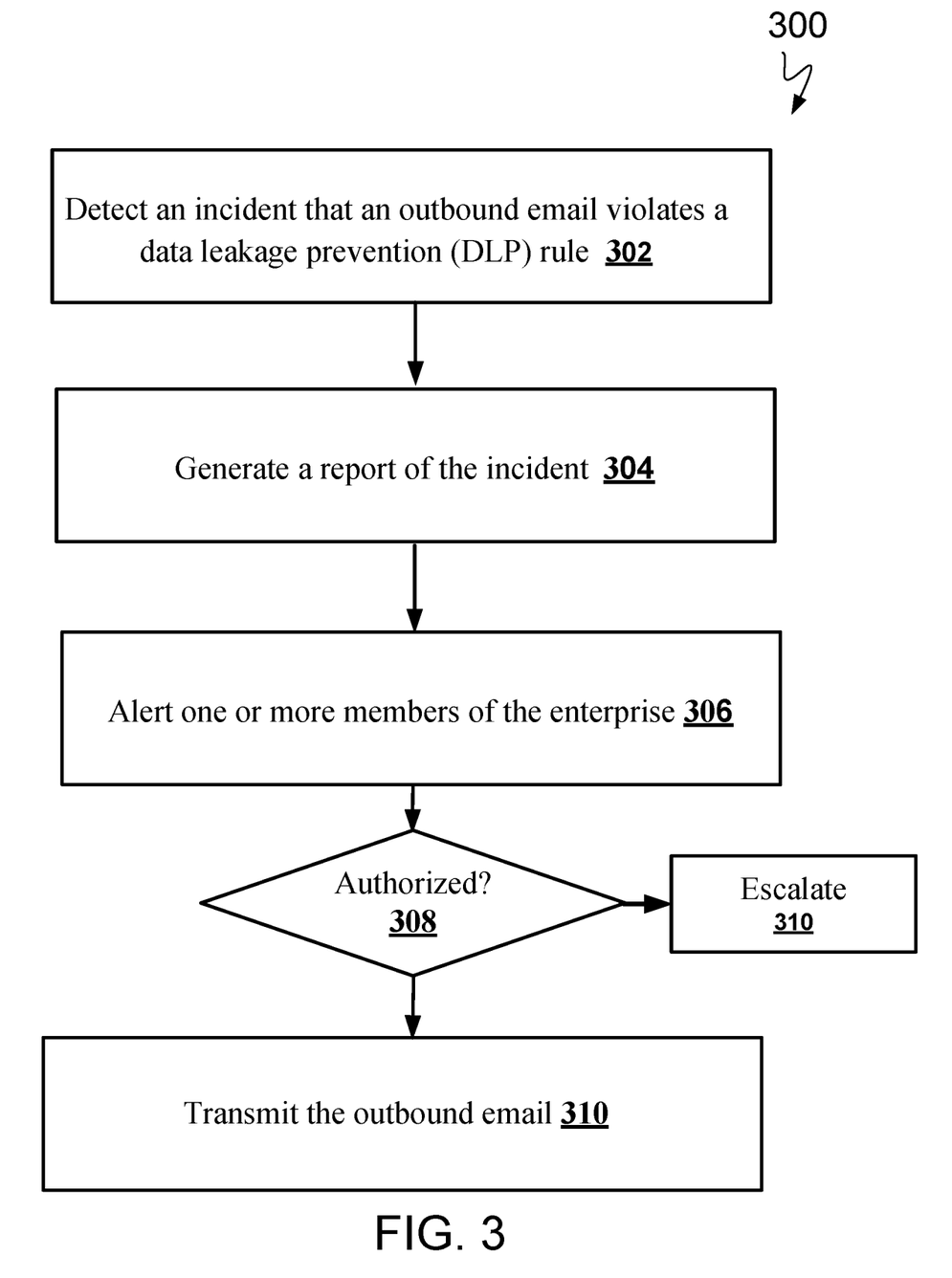
FIG. 3 illustrates an example of a flow chart according to an implementation of the present disclosure.

FIG. 3 is a flow chart 300 illustrating an example of a work flow according to some implementations. The process may detect an outbound email slated for transmission but violates a data leakage prevention (DLP) rule (302). Although without sensitivity labels, the outbound email may nonetheless contain contents that are sensitive or confidential which may not be sent outside the enterprise. The email engine may leverage natural language processing using a taxonomy of vocabulary and linguistic rules to identify emails with body contents or attachment contents that may contain sensitive data. The detection may cause the process to generate a report detailing the incident (304). In various examples, the detection may take place in near realtime. For example, the report can be generated as soon as the incident is detected and the parties are alerted instantly. The report may lay out the time and severity of the violation as well as an indication of the basis for the violation. The report can be informative to a human user. The process may then alert one or more members of the enterprise (306). In one example, a message is sent to the sender of the outbound email. The message can be by way of email or text messaging. The message can include a link to the report. The message may solicit a justification from the sender for sending the outbound email that triggered the report. In another example, a message is sent to an information security analyst (ISA) of the enterprise. The ISA may follow up with the employee who sent the outbound email to further investigate. The ISA may also reach out to the manager of the employee. In yet another example, a message is sent to a supervisor (e.g., the department head) of the employee who sent the outbound email. In this case, the supervisor may review the report detailing the incident, and the justification from the employee. The supervisor may additionally request assistance from the ISA. The process may then determine whether the outbound email is authorized (308). Here, the authorization may come from the supervisor, or a delegate (including an ISA). If the outbound email is authorized, the process may proceed to close, for example, by transmitting the outbound email (310). As described above, in some cases, the detected outbound email is withheld, pending internal authorization. If the outbound email is not authorized, the process may proceed to escalate the matter (310). In some cases, the matter can be escalated to the attention of, for example, corporate data security office.

Figure 4:
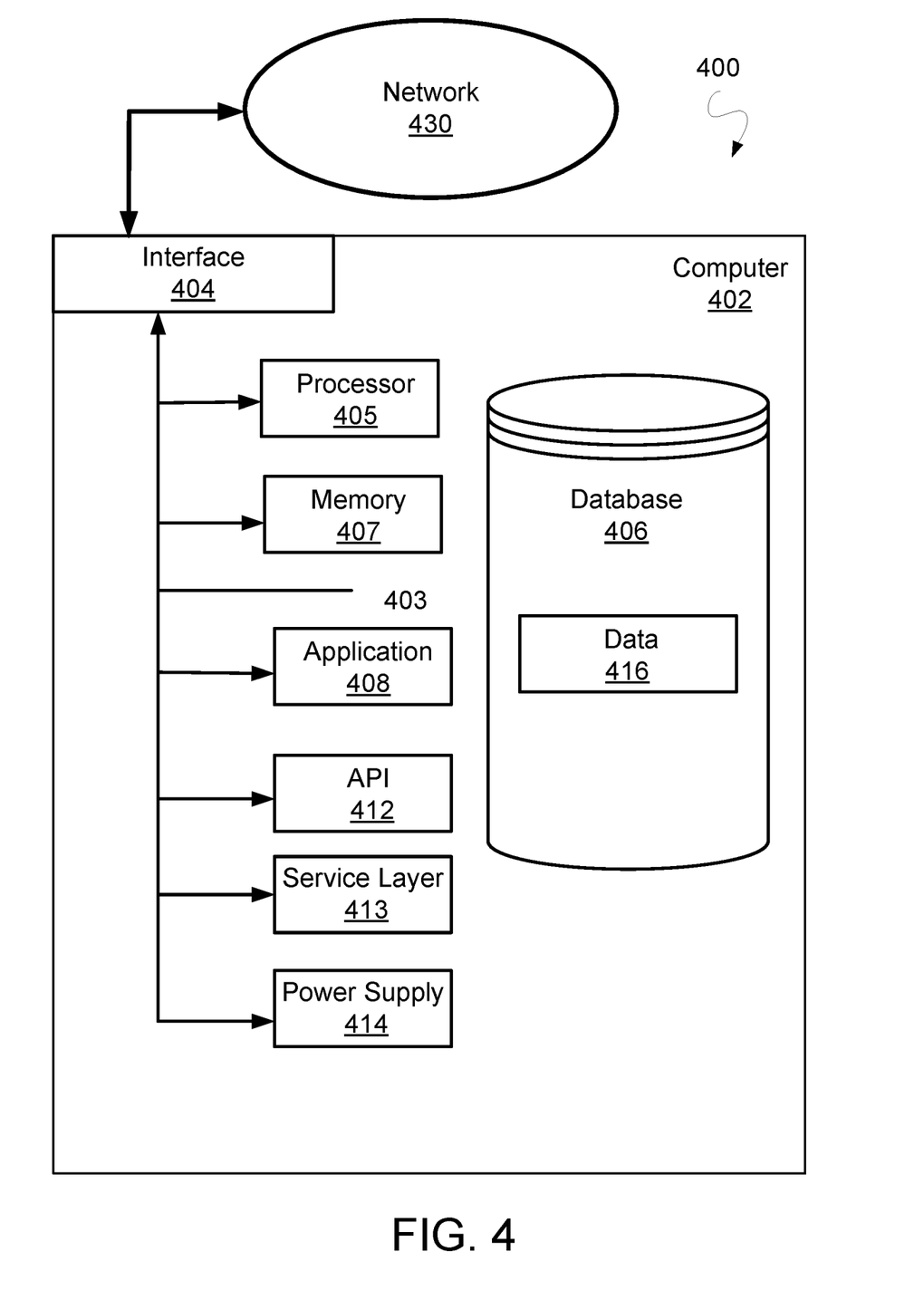
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 404 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds the previously described data 416 including, for example, an internal CRM database showing the organizational chart of each employee with their supervisor or department head, the taxonomy of vocabulary and linguistic rules to implement natural language processing of the contents of outbound emails.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
    detecting an incident that an outbound email violates a data leakage prevention (DLP) rule of an enterprise network, wherein the DLP rule specifies contents that are reserved for within the enterprise network, and wherein the DLP rule is installed on a mail server of the enterprise network such that the outbound email is monitored and withheld at the mail server without leaving the enterprise network;
    automatically alerting one or more members of the enterprise of the incident based on a report detailing the incident, wherein the report detailing the incident is generated within 1 millisecond when the incident is detected such that at least one member of the enterprise is alerted immediately upon detection, wherein at least one member of the enterprise is provided with a link to a dashboard where the report detailing the incident is viewable, wherein the at least one member of the enterprise comprises a supervisor of a sender of the outbound email, wherein the supervisor is identified based on an internal database of the enterprise; and receiving a response from the supervisor, wherein the response is provided through the dashboard and indicates whether the outbound email is authorized.

2. The computer-implemented method of claim 1, wherein automatically alerting one or more members of the enterprise comprises:
identifying the sender of the outbound email; and
alerting, using the link to the dashboard, the sender of the outbound email.

3. The computer-implemented method of claim 2, further comprising:
providing, at the dashboard, a solicitation for a justification for sending the outbound email from the sender.

4. The computer-implemented method of claim 3, further comprising:
receiving the justification from the sender entered at the dashboard.

5. The computer-implemented method of claim 1, further comprising:
in response to receiving a determination from the supervisor entered at the dashboard that the outbound email is authorized, sending the outbound email outside the enterprise.

6. The computer-implemented method of claim 1, wherein automatically alerting one or more members of the enterprise comprises:
automatically alerting, using the link to the dashboard, an information security analyst (ISA) of the outbound email.

7. The computer-implemented method of claim 1, further comprising:
whitelisting one or more employees of the enterprise such that outbound emails from the one or more employees are not subject to the DLP rule.

8. A computer system comprising one or more hardware processors configured to perform operations of:
detecting an incident that an outbound email violates a data leakage prevention (DLP) rule of an enterprise network, wherein the DLP rule specifies contents that are reserved for within the enterprise network, and wherein the DLP rule is installed on a mail server of the enterprise network such that the outbound email is monitored and withheld at the mail server without leaving the enterprise network;

automatically alerting one or more members of the enterprise of the incident based on a report detailing the incident, wherein the report detailing the incident is generated within 1 millisecond the incident is detected such that at least one member of the enterprise is alerted immediately upon detection, wherein at least one member of the enterprise is provided with a link to a dashboard where the report detailing the incident is viewable, wherein the at least one member of the enterprise comprises a supervisor of a sender of the outbound email, wherein the supervisor is identified based on an internal database of the enterprise; and receiving a response from the supervisor, wherein the response is provided through the dashboard and indicates whether the outbound email is authorized.

9. The computer system of claim 8, wherein automatically alerting one or more members of the enterprise comprises:
identifying the sender of the outbound email; and
alerting, using the link to the dashboard, the sender of the outbound email.

10. The computer system of claim 9, wherein the operations further comprise:
providing, at the dashboard, a solicitation for a justification for sending the outbound email from the sender.

11. The computer system of claim 10, wherein the operations further comprise:
receiving the justification from the sender entered at the dashboard.

12. The computer system of claim 8, wherein the operations further comprise:
in response to receiving a determination from the supervisor entered at the dashboard that the outbound email is authorized, sending the outbound email outside the enterprise.

13. The computer system of claim 8, wherein automatically alerting one or more members of the enterprise comprises:
automatically alerting, using the link to the dashboard, an information security analyst (ISA) of the outbound email.

14. The computer system of claim 8, wherein the operations further comprise:
whitelisting one or more employees of the enterprise such that outbound emails from the one or more employees are not subject to the DLP rule.

* * * * *